United States Patent [19]

Imamura

[11] 4,387,792
[45] Jun. 14, 1983

[54] MECHANICAL PARKING BRAKE MECHANISMS

[75] Inventor: Noriaki Imamura, Toyota, Japan

[73] Assignee: Toyota Jidosha Kogyo Kabushiki Kaisha, Toyota, Japan

[21] Appl. No.: 269,598

[22] Filed: Jun. 2, 1981

[30] Foreign Application Priority Data

Jul. 31, 1980 [JP] Japan ................... 55-106622

[51] Int. Cl.³ ............................................ F16D 51/00
[52] U.S. Cl. ........................... 188/328; 188/106 A; 188/106 F; 188/331
[58] Field of Search ............... 188/325, 78, 328, 329, 188/331-334, 326, 327, 340-343, 79.5, 362, 363, 106, 330, 24.21

[56] References Cited

U.S. PATENT DOCUMENTS 3,322,237  5/1967  Keller et al. .................... 188/331
3,482,658 12/1969  Keller ............................. 188/106 A
3,575,266  4/1971  Sitchin ............................ 188/331
3,999,637 12/1976  Schumacher .................. 188/331 X Primary Examiner—Douglas C. Butler
Attorney, Agent, or Firm—Parkhurst & Oliff

[57] ABSTRACT

A mechanical parking brake mechanism which comprises firstly a sector pulley pivoted on the backing plate of a brake drum to guide an intermediate portion of a parking brake wire and formed at its guide face with at least two radial recesses spaced from each other at a predetermined interval and secondly a parking brake wire integrally provided at its intermediate portion with at least two projections to be selectively engaged with the respective recesses of the sector pulley in accordance with the length of pulling stroke of the parking brake wire, thereby to avoid undesired excessive force acting on the parking brake wire and to enhance transfer efficiency in the input force applied to the parking lever of the mechanism.

4 Claims, 5 Drawing Figures

MECHANICAL PARKING BRAKE-MECHANISMS

BACKGROUND OF THE INVENTION

The present invention relates to a parking brake mechanism assembled within a hydraulic drum brake assembly for wheeled vehicles, and relates more particularly to a mechanical parking brake mechanism of the type which includes a parking lever assembled within such a hydraulic drum brake assembly as a leading-trailing type drum brake, a duo-servo type drum brake, or the like, the parking lever being arranged to cooperate with a strut of the drum brake assembly in such a way as to displace a pair of brake shoes outwardly toward the inner periphery of the brake drum.

In such a conventional parking brake mechanism as described above, a parking brake wire is connected to the free end of the parking lever and is guided at its intermediate portion by means of such a guide device as an anchor plate for the brake shoes, a bell-crank or a sector pulley pivoted to the backing plate of the brake drum, or the like. When an anchor plate is applied to guide the parking brake wire, frictional resistance at the guided portion of the parking brake wire results in a decrease in the transfer efficiency of the input force applied to the parking lever. In the case that the parking brake wire is guided by provision of a bell-crank, the lever ratio of the parking lever changes in accordance with the length of the pulling stroke of the parking brake wire. Furthermore, in the case that a sector pulley is applied to guide the parking brake wire, it is required to fix the intermediate portion of the parking brake wire to a portion of the guide face of the sector pulley by means of caulking. If the length of pulling stroke of the wire increases to produce an excessive force acting on the fixed portion of the wire, the wire will be disconnected at its fixed portion, resulting in a marked decrease in the transfer efficiency of the input force.

SUMMARY OF THE INVENTION

It is, therefore, a primary object of the present invention to provide an improved parking brake mechanism which comprises firstly a sector pulley pivoted to the backing plate to guide thereon an intermediate portion of the parking brake wire and formed at its guide face with at least two radial recesses spaced from each other at a predetermined interval, and secondly a parking brake wire integrally provided at its intermediate portion with at least two projections to be selectively engaged with the respective recesses of the sector pulley in accordance with the length of the pulling stroke of the parking brake wire, thereby to avoid undesired excessive force acting on the parking brake wire and to enhance the transfer efficiency of the input force given to applied parking lever.

BRIEF DESCRIPTION OF THE DRAWINGS

Additional objects and advantages of the present invention will be more readily apparent from the following detailed description of preferred embodiments thereof when taken together with the accompanying drawings, in which.

DESCRIPTION OF THE PREFERRED EMBODIMENTS

Figure 1:
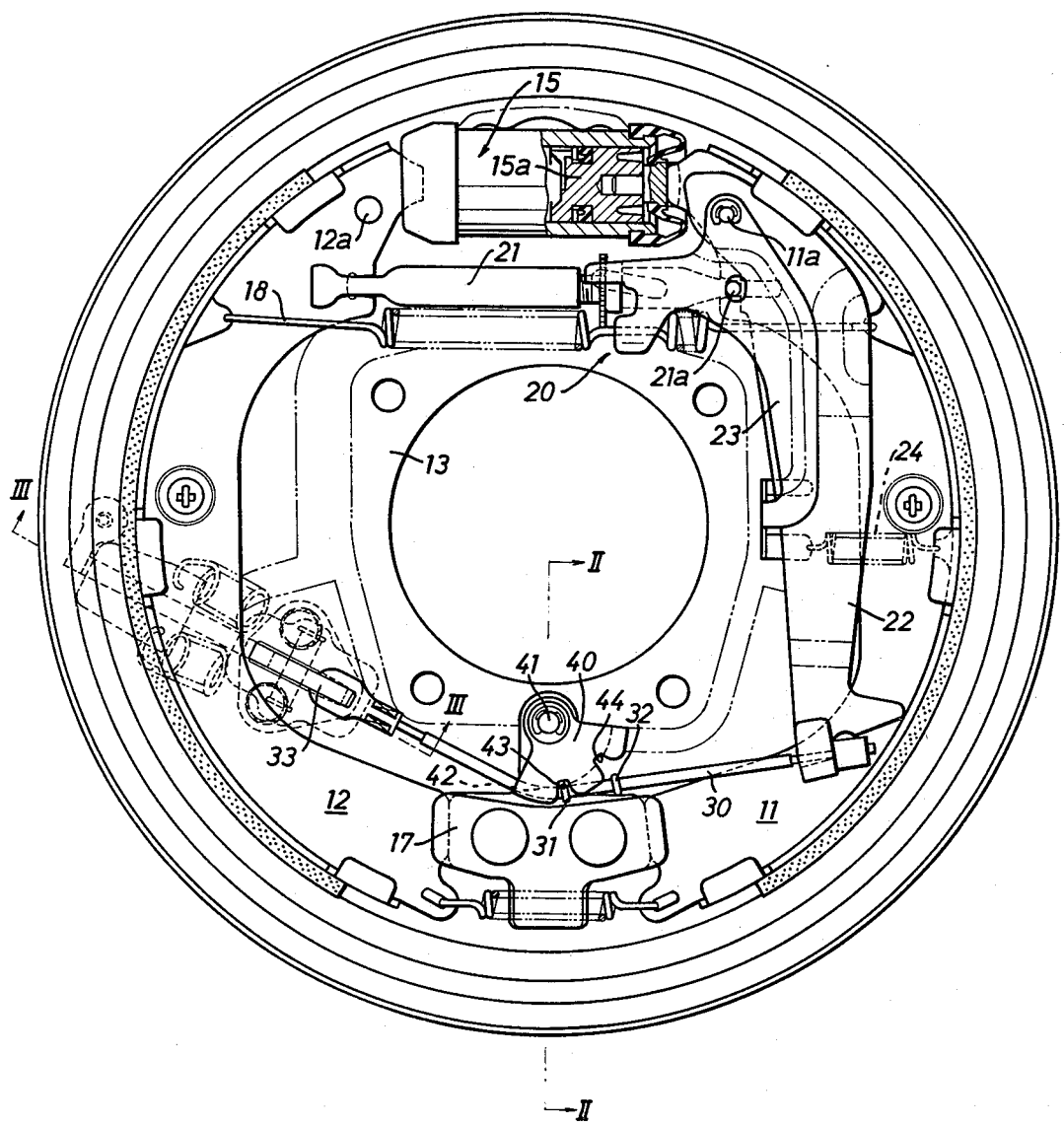
FIG. 1 is a front view of a hydraulic drum brake assembly of the leading-trailing type equipped with a parking brake mechanism in accordance with the present invention.
Figure 2:
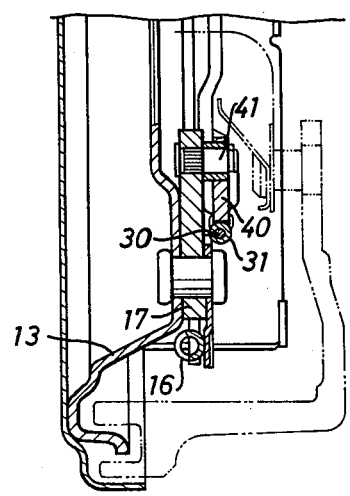
FIG. 2 is a cross-sectional view taken along line II—II in FIG. 1.
Figure 3:
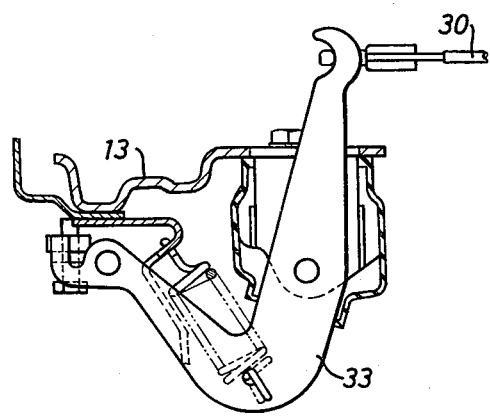
FIG. 3 is a cross-sectional view taken along line III—III in FIG. 1.

Referring now to the drawings, in particular to FIGS. 1 through 3, a conventional hydraulic drum brake assembly of the leading-trailing type is provided with a mechanical parking brake mechanism to which the present invention is applied. In this embodiment, leading and trailing brake shoes 11 and 12 are mounted on the backing plate 13 of a brake drum by means of respective pins 11a and 12a in such a manner that they are floatably assembled and arranged to be displaced outwardly toward the inner periphery of the brake drum. The brake shoes 11 and 12 are respectively engaged at one end thereof with each outer end of a pair of pistons 15a, 15a in a hydraulic wheel cylinder 15, whereas the other ends of brake shoes 11 and 12 are connected to each other by means of a coil spring 16 and resiliently engaged with opposite ends of an anchor plate 17 which is secured to the backing plate 13. Furthermore, a return spring 18 is assembled to bias the brake shoes 11 and 12 inwardly, and a conventional automatic brake shoe adjustor 20 is assembled to automatically adjust the annular clearance between the lining of the respective brake shoes 11 and 12 and the inner periphery of the brake drum.

The automatic brake shoe adjustor 20 includes a strut 21 which is engaged at its opposite ends with the shoes 11 and 12. The strut 21 is assembled as a structural member of the parking brake mechanism. A parking lever 22 is pivoted to the backing plate 13 coaxially with the leading brake shoe 11 by means of pin 11a and is engaged at its inner side-face with a pin 21a which is integrally fixed to the strut 21. The parking lever 22 is also connected at its free end with one end of a parking brake wire 30.

As can be well seen in FIG. 3, the parking brake wire 30 is connected at its other end with a bell-crank 33 which is pivoted on the back face of backing plate 13. The parking brake wire 30 is provided at its intermediate portion with two annular projections 31 and 32 which are fixed to wire 30 at a predetermined interval. As can be well seen in FIGS. 1 and 2, a sector pulley 40 is pivoted on the backing plate 13 by means of a pin 41 which is secured to a radial extension of anchor plate 17. The sector pulley 40 is formed at its outer periphery with a semi-circular guide groove 42 and with two spaced radial recesses 43 and 44 which are arranged to receive therein the corresponding projections 31 and 32 of wire 30. With the above arrangement, the intermediate portion of wire 30 is constantly guided by the guide groove 42 of pulley 40 and is engaged with the sector pulley 40 thanks to engagement of the projection 31 with the corresponding radial recess 43. In the actual practice of the present invention, the interval between radial recesses 43 and 44 and the interval between projections 31 and 32 are determined in such a manner that even if the first projection 31 disengages from the corresponding recess 43 due to increase in length of the pulling stroke of wire 30, the second projection 32 is reliably engaged with the corresponding recess 44.

In operation of the parking brake mechanism, a manual parking lever in the vehicle compartment is operated to rotate the bell-crank 33 counterclockwise by way of a parking cable (not shown), the input force given to the cable is transmitted to the parking brake wire 30 to rotate the parking lever 22 inwardly around pin 11a. The reaction force acting on the parking lever 22 is transmitted to the leading and trailing shoes 11 and 12 by way of pin 21a and strut 21, and in turn both the brake shoes 11 and 12 are displaced outwardly against the biasing force of return spring 18 to produce a braking force by frictional engagement with the brake drum. During this operation, the engagement of projection 31 with the corresponding radial recess 43 acts to rotate the sector pulley 40 in accordance with the displacement of the parking brake wire 30. This serves to enhance transfer efficiency in the pulling input force applied to the wire 30. If the length of the pulling stroke of wire 30 increases due to lining defacement of the brake shoes 11 and 12, the first projection 31 of wire 30 disengages from the corresponding radial recess 43, and in turn the second projection 32 of wire 30 is engaged with the corresponding recess 44 to rotate the sector pulley 40 in response to the displacement of the wire 30. This serves to avoid undesired excessive force acting on the wire 30 and to ensure transfer efficiency in the input force applied to the parking lever 22.

Figure 4:
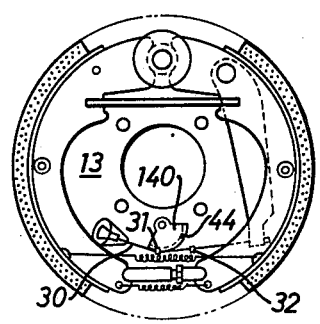
FIG. 4 is a front view of a hydraulic drum brake of the duo-servo type equipped with a parking brake mechanism in accordance with the present invention.
Figure 5:
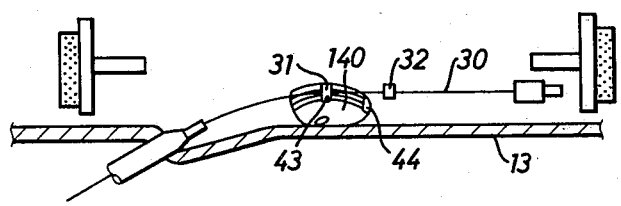
FIG. 5 is an enlarged view showing the arrangement of the sector pulley shown in FIG. 4.

In summary, the above embodiment is characterized by the fact that the parking brake wire 30 is integrally provided at its intermediate portion with projections 31 and 32 which are arranged to be selectively engaged with the respective radial recesses 43 and 44 of sector pulley 40 in accordance with the length of pulling stroke of the parking brake wire 30. In the actual practice of the present invention, the number of projections on the parking brake wire and the number of the corresponding radial recesses in the sector pulley may be increased in accordance with the length of pulling stroke of the wire. As shown in FIGS. 4 and 5, the present invention can be adapted to a conventional duo-servo drum brake in which a sector pulley 140, corresponding with pulley 40 in FIG. 1, is pivoted to a portion of the backing plate 13 at a predetermined slant angle to smoothly guide the parking brake wire 30 thereon. In addition, the parking brake wire 30 is directly connected to the parking brake cable.

Although certain specific embodiments of the present invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A mechanical parking brake mechanism including a parking lever assembled within a drum brake assembly and connected with a parking brake wire to be manually operated, said parking lever being arranged to cooperate with a strut of said drum brake assembly so as to displace a pair of brake shoes outwardly toward the inner periphery of a brake drum, said parking brake mechanism comprising:

a sector pulley pivoted to the backing plate of said brake drum and having a semi-circular guide face for guiding an intermediate portion of said parking brake wire, said semi-circular guide face being formed with at least two radial recesses spaced from each other at a predetermined interval; and at least two projections integrally provided on the intermediate portion of said parking brake wire and arranged to be selectively engaged with the respective radial recesses in accordance with the length of pulling stroke of said wire to rotate said sector pulley in response to the movement of said parking brake wire.

2. A mechanical parking brake mechanism as claimed in claim 1, wherein said semi-circular guide face of said sector pulley is in the form of a semi-circular guide groove for receiving the intermediate portion of said parking brake wire.

3. A mechanical parking brake mechanism as claimed in claim 1 or 2, wherein said sector pulley is pivoted on a portion of an anchor plate secured to the backing plate of said brake drum.

4. A mechanical parking brake mechanism as claimed in claim 1 or 2, wherein said sector pulley is pivoted at a predetermined slant angle to smoothly support the intermediate portion of said parking brake wire.

* * * * *